(12) United States Patent
Naritomi et al.

(10) Patent No.: US 8,231,982 B2
(45) Date of Patent: Jul. 31, 2012

(54) COMPOSITE OF METAL AND RESIN, AND METHOD FOR MANUFACTURING SAME

(75) Inventors: Masanori Naritomi, Tokyo (JP); Naoki Andoh, Tokyo (JP)

(73) Assignee: Taisei Plas Co., Ltd., Tokyo (JP)

( * ) Notice: Subject to any disclaimer, the term of this patent is extended or adjusted under 35 U.S.C. 154(b) by 711 days.

(21) Appl. No.: 12/302,130

(22) PCT Filed: May 25, 2006

(86) PCT No.: PCT/JP2006/310419
§ 371 (c)(1),
(2), (4) Date: Nov. 24, 2008

(87) PCT Pub. No.: WO2007/138641
PCT Pub. Date: Dec. 6, 2007

(65) Prior Publication Data
US 2009/0117401 A1    May 7, 2009

(51) Int. Cl.
*B29C 45/14* (2006.01)
*B29C 65/70* (2006.01)
*B32B 3/10* (2006.01)
*B22F 3/00* (2006.01)
*B29C 69/00* (2006.01)
*B29C 45/00* (2006.01)

(52) U.S. Cl. ........ 428/545; 428/131; 428/132; 428/133; 428/134; 428/135; 428/136; 428/137; 428/138; 428/139; 428/140; 428/580; 425/120; 425/127; 425/401; 264/241; 264/259; 264/274; 264/328.1; 264/328.12; 264/328.8; 264/645

(58) Field of Classification Search ................. 428/131, 428/132, 133, 134, 135, 136, 137, 138, 139, 428/140, 545, 580; 425/120, 127, 401; 264/241; 264/259, 274, 328.1, 328.12, 328.8, 645; 361/142, 600, 616, 667, 679.02, 679.34; 445/90.3, 128, 575.8; 379/433.11, 437, 440, 379/451
See application file for complete search history.

(56) References Cited

U.S. PATENT DOCUMENTS
3,951,375 A * 4/1976 Lovell ............................ 249/107
2002/0000685 A1* 1/2002 Beaumont et al. .......... 264/297.1
2004/0062943 A1* 4/2004 Naritomi et al. .............. 428/545

FOREIGN PATENT DOCUMENTS
JP  7-88881 A      4/1995
JP  2002-225073 A  8/2002

OTHER PUBLICATIONS
International Search Report of PCT/JP2006/310419, date of mailing Aug. 15, 2006.

* cited by examiner

Primary Examiner — David R Sample
Assistant Examiner — Kendra Keith
(74) Attorney, Agent, or Firm — Westerman, Hattori, Daniels & Adrian, LLP

(57) ABSTRACT

A composite of a metal and a resin, in which a shaped metal and a shaped thermoplastic resin are integrally joined by injection molding, and in which the perpendicular precision of the thermoplastic shaped body with respect to the shaped metal is improved, as well as a method for manufacturing the composite. A composite 40 of a metal and a resin is composed of a shaped metal 20 and a shaped thermoplastic resin that is integrally joined to this shaped metal 20 by injection molding. The shaped thermoplastic resin comprises a seat 42 and a boss 41 that protrudes from the seat 42. A runner 43 is provided which communicates with the seat 42 via two sprues and through which a molten thermoplastic resin that has been injected through an injection gate 45 flows into the boss 41 and the thermoplastic resin injected through the injection gate 45 flows through the sprues 47 to opposite locations of the boss 41 substantially uniformly, thereby filling the locations. As a result, the boss 41 can be joined perpendicularly to the shaped metal 20 by injection joining.

6 Claims, 10 Drawing Sheets

COMPOSITE OF METAL AND RESIN, AND METHOD FOR MANUFACTURING SAME

FIELD OF THE INVENTION

The present invention relates to a composite of a metal and a resin, in which a shaped metal and a shaped thermoplastic resin having a upright molding are integrally joined, and which is used in housings for electronic equipments, housings for consumer electrical equipments, structural parts, mechanical parts and so forth, and also to a method for manufacturing such a composite. More specifically, the present invention relates to a composite of a metal and a resin, in which a shaped thermoplastic resin having an upright molding is securely and integrally joined by injection molding to a shaped metal made by various types of machining, and in which the perpendicular precision of the upright molding with respect to the shaped metal is improved.

BACKGROUND OF THE INVENTION

Techniques for integrating a metal with a resin is needed in a wide range of fields such as automobiles, consumer electrical products, industrial machinery and parts manufacturing thereof, and many different adhesives have been developed under such circumstances. Included in these are some truly outstanding adhesives. An adhesive that exhibits its function at normal or raised temperature is used to integrally join a metal and a synthetic resin and this method is currently a standard technique.

However, study has been made for a more rational method for joining that does not involve use of an adhesive. An example of a method for joining high-strength engineering plastics to a light metal (such as magnesium, aluminum, or an alloy thereof) or a ferric metal (such as stainless steel) is the method developed by the present inventors, in which a shaped metal is inserted into a metallic mold, a thermoplastic resin is injected into the metallic mold and then the shaped metal and formed thermoplastic resin are integrally joined (hereinafter referred to as "injection joining"). This "injection joining" method was developed through years of research made by the inventors and the details thereof have been disclosed (see Patent Document 1: Japanese Patent Application Laid-Open 2003-251654, for example).

There is another known method in which a special organic compound is used to cover the surface of a shaped metal with an organic phase by organic plating and this is inserted into an metallic mold for injection molding and a thermoplastic resin is injected there to make injection joining (see Patent Document 2: Japanese Patent Application Laid-Open 2000-160392, for example).

In yet another method, an aluminum alloy is oxidized by anodic oxidation, after which it is inserted into a metallic mold and then a thermoplastic resin is joined with the aluminum alloy by hot pressing (see Patent Document 3: WO2004/055248 A1, for example).

When a PBT resin or PPS resin is integrated with an aluminum alloy by the "injection joining" method developed by the inventors, the joint is so strong that breaking this product requires a shear force of 19.6 to 29.4 MPa (200 to 300 kgf/cm$^2$). This "injection joining" method holds promise for use in many different fields such as in manufacturing various devices and various parts. In view of this, the inventors attempted to manufacture a wide variety of parts and products involving integration by the "injection joining" method. As a result, problems were sometimes encountered when the injection joining was performed with a conventional resin molding technique. The thermoplastic resin that is integrated with the shaped metal comes in various shapes, such as a boss or a rib. For instance, when, in a case of a boss with a screw-fastening hole on a base plate, the boss is injection molded using a shaped aluminum alloy inserted in a metallic mold as the base plate, such a problem occurred that the boss always tilts in the direction of a gate mark. If this screw-fastened boss is not provided perpendicularly, problems may occur when it is attached to something. The same problems were encountered with the injection joining of a rib.

The problems arising when injection joining is performed with prior art will be described more concretely with reference to FIGS. 17 and 18.

FIG. 17 is an oblique view of a composite 100 in which a shaped thermoplastic resin having a boss, a seat, etc. is joined by injection joining to an aluminum alloy piece (shaped metal) 20. FIG. 18 is a front view of the composite 100, and is a diagram schematically illustrating the error that occurs in the perpendicular precision of a boss 101.

A commercially available A5052 aluminum alloy sheet with a thickness of 1 mm was purchased and cut into rectangular pieces with a dimension of 40 mm×60 mm. A dipping jig completely covered with vinyl chloride resin was fabricated by braiding stainless steel wire and dipping it into molten vinyl chloride resin and then many of the above-mentioned aluminum alloy pieces were fitted therein.

A 15% aqueous solution of a commercially available aluminum degreaser was placed in a degreasing tank and brought to 70° C. The dipping jig with the aluminum alloy pieces therein was dipped for 5 minutes in this tank and then washed by dipping it in a water rinsing tank. This product was then dipped for 1 minute in a 40° C. preliminary acid washing tank containing a 1% hydrochloric acid aqueous solution, and then washed by dipping it in another water rinsing tank.

This product was then dipped for 1 minute in a 40° C. alkali etching tank containing a 1% caustic soda aqueous solution, and then washed by dipping it in another water rinsing tank. Next, it was dipped for 1 minute in a 40° C. neutralization tank containing a 1% hydrochloric acid aqueous solution, and then washed by dipping it in another water rinsing tank. After this, it was dipped for 1 minute in a 60° C. main treatment tank containing a hydrazine monohydrate aqueous solution with a concentration of 4%, and then washed by dipping it in another water rinsing tank. The aluminum alloy pieces, still fitted in the dipping jig, were placed in a warm air dryer, dried for 15 minutes at 40° C. and 5 minutes at 60° C., thereafter were removed from the dipping jig, wrapped in aluminum foil and stored.

A metallic mold was fabricated for molding the composite 100 shown in FIG. 17 by injection joining. An aluminum alloy piece 20 that had undergone the above-mentioned dipping, washing and other such pretreatment was inserted into the mold, which had been heated to 140° C., and a PPS resin (polyphenylene sulfide resin; trademark SGX120, made by Tosoh Co.) was joined by injection joining by a method in which the resin was injected from an injection gate 105 at an injection temperature of 310° C. Approximately twenty of the composites 100 were injection molded. The PPS resin flowed into and filled a boss (upright molding) portion 101 via a runner 103 and a seat 102, where a hole 104 had been formed in the boss 101. The integrated composite 100 was placed for 1 hour in a air dryer which was set at 170° C. and then gradually cooled to relieve internal strain.

When we look closely at the boss 101 of the composite 100 here, we see that the upper part is tilted toward the mark of injection gate 105. The amount of tilt was measured with a three-dimensional gauge. Specifically, using the center position at the bottom of the boss as a reference, the error of the center position at the top of the boss was measured. This error δ was from +0.20 mm to +0.27 mm. The height h of the boss 101 was 15 mm. If we express this using the direction on the injection gate 105 mark side as the positive direction with respect to the boss 101 center, the boss 101 was tilted to the injection gate side by (+0.20 mm to +0.27 mm)/15 mm (see FIG. 18).

In the field of injection molding technology, there is a known technique for increasing the perpendicular precision of the molded part (see Patent Document 4: Japanese Patent Application Laid-Open H07-156195, for example) in the molding of parts with a large height such as a boss. This technique relates to outsert molding, that is, molding and integrating in such a manner that the bottom of a resin boss sandwiches a holed substrate, where restricting means are provided for restricting the flow and the orientation of the resin material, which improves the perpendicular precision of a part with a large height such as a boss. However, while this method might be favorable for outsert molding, it was not suited to the injection joining discussed in Patent Document 1. Specifically, in the above-mentioned "injection joining" method, the high-temperature and high-pressure resin flow needs to come into contact with a metal surface in which there are minute recesses, which precludes the use of a method in which the resin material flow, etc., is restricted by a restricting means as with the technique of Patent Document 4. In other words, the high joint strength obtained with the "injection joining" method of Patent Document 1 could not be obtained with the technique of Patent Document 4, and so the molding and integration were made in such a manner that the substrate was sandwiched by the resin. Also, when integration was achieved by outsert molding by the technique of Patent Document 4, the perpendicular precision of the part with respect to the substrate was still not adequate.

Specifically, in a method in which a thermoplastic resin is brought into contact with a metal surface without the strength of its flow being diminished and a shaped thermoplastic resin having a boss, rib or other such upright molding is integrated by injection joining to a shaped metal, there has been no technique with which the perpendicular precision of the upright molding with respect to the shaped metal could be kept within the desired range, hence there has been an urgent need for such a technique to be developed.

The inventors have put diligent efforts over many years for developing, disseminating, etc, a technique for integrating a shaped metal and a shaped thermoplastic resin by the above-mentioned "injection joining" method. The present invention was conceived in light of resolving those problems encountered with the above-mentioned "injection joining" method and achieving the following object.

SUMMARY OF THE INVENTION

It is an object of the present invention to provide a composite of a metal and a resin, in which a shaped metal and a shaped thermoplastic resin having a upright molding are integrated by injection joining and in which the perpendicular precision of an upright molding with respect to the shaped metal is improved, and also to provide a method for manufacturing such a composite.

The present invention has following aspects for achieving the aforementioned object.

In the first aspect of the invention, a composite of a metal and a resin is provided, which is composed of a pretreated shaped metal and a shaped thermoplastic resin integrally joined to one face of the shaped metal by injection molding, wherein the shaped thermoplastic resin comprises a seat and an upright molding protruding from this seat, a runner is provided which communicates with the seat via two or more sprues and through which a molten thermoplastic resin injected through an injection gate flows into the upright molding, and the thermoplastic resin injected through the injection gate flows to and fills locations of the upright molding, opposite to each other with respect to a straight line passing through the center of the upright molding, such that the flow amount per unit of time is substantially uniform.

In the second aspect of the invention, the composite of a metal and a resin according to the first aspect is further characterized in that the runner is split into two ways by a splitter, the sprues and the upright molding are formed to have a shape in plan view that is symmetrical with respect to a first straight line passing through the center of the upright molding, the thermoplastic resin is guided preferentially to the upright molding on the farther side away from the injection gate in the direction of a second straight line passing through the center of the upright molding and perpendicular to the first straight line, utilizing the direction of flow of the thermoplastic resin coming out of the sprues, and the thermoplastic resin flows to and fills locations of the upright molding, opposite to each other with respect to the first straight line and the second straight line, such that the flow amount per unit of time is substantially uniform.

In the third aspect of the invention, the composite of a metal and a resin according to the first aspect is further characterized in that the runner is split into two ways, the sprues and the upright molding are formed to have a shape in plan view that is symmetrical with respect to a first straight line passing through the center of the upright molding and a second straight line that is perpendicular to the first straight line, and the thermoplastic resin flows to and fills the locations of the upright molding, opposite to each other with respect to the first straight line and the second straight line, such that the flow amount per unit of time is substantially uniform.

In the fourth aspect of the invention, the composite of a metal and a resin according to the third aspect is further characterized in that the runner is formed to have a shape that is symmetrical with respect to the first straight line.

In the fifth aspect of the invention, the composite of a metal and a resin according to the first aspect is further characterized in that the injection gate and the runner are formed in pairs respectively, and the thermoplastic resin injected from the pair of injection gates flows through a pair of sprues formed substantially in symmetry to opposite locations of the upright molding, such that the flow amount per unit of time is substantially uniform, thereby filling the locations.

In the sixth aspect of the invention, the composite of a metal and a resin according to the first aspect is further characterized in that the sprues and the upright molding are formed to have a shape in plan view that is symmetrical with respect to a first straight line passing through the center of the upright molding, a cut-out is formed near a communicating part between the seat and the sprues, the cut-out utilizes the flow of thermoplastic resin to guide the thermoplastic resin preferentially to the upright molding on the farther side away from the injection gate in the direction of a second straight line passing through the center of the upright molding and perpendicular to the first straight line, and the thermoplastic resin flows to and fills locations of the upright molding, opposite to each other with respect to the first straight line and the second straight line, such that the flow amount per unit of time is substantially uniform.

In the seventh aspect of the invention, a composite of a metal and a resin is provided, which is composed of a pretreated shaped metal and a shaped thermoplastic resin integrally joined to one face of this shaped metal by injection molding, wherein the shaped thermoplastic resin comprises a seat and an upright molding protruding from this seat, a runner, through which a molten thermoplastic resin injected from the injection gate flows to the upright molding, is provided communicably with the seat and so as to be in contact with an outer periphery of the base of the seat, and the thermoplastic resin flows to and fills the upright molding while undergoing a circulating motion.

In the eighth aspect of the invention, the composite of a metal and a resin according to any of the first to seventh aspects is further characterized in that said upright molding is a boss.

In the ninth aspect of the invention, the composite of a metal and a resin according to any of the first to seventh aspects is further characterized in that said upright molding is a rib.

In the tenth aspect of the invention, a method for manufacturing the composite of a metal and a resin according to any of the first to seventh aspects is provided, which comprises steps of:

inserting a pretreated shaped metal into a first metallic injection mold and/or a second metallic injection mold, fixing the first metallic injection mold and the second metallic injection mold, thereby forming a cavity for joining a shaped thermoplastic resin comprising a seat and an upright molding protruding from this seat integrally to the shaped metal, injecting the thermoplastic resin through an injection gate of the metallic injection mold into the cavity, making the thermoplastic resin flow to locations of the upright molding opposite to each other with respect to a straight line passing through the center of the upright molding, such that the flow amount is substantially uniform per unit of time, or making the thermoplastic resin flow while circulating, and joining the thermoplastic resin by injection molding integrally to one face of the shaped metal.

The present invention will now be described by going through the steps of the manufacturing method.

[Shaped Metal and Liquid Treatment Method Thereof]

The composite of a metal and a resin of the present invention may be produced by subjecting a shaped metal (preferably aluminum alloy) to liquid treatment, inserting this product into a metallic mold for injection molding, injecting a PBT (polybutylene terephthalate) resin or a PPS (polyphenylene sulfide) resin into the metallic mold and integrally joining the shaped metal and the resin.

An aluminum alloy is favorable as the metal material in the present invention. This aluminum alloy can be one in the A1000 to A7000 series as specified by JIS or any of various alloys that meet the casting grade specified by JIS. The shaped metal is worked into the shape and structure required of an insert in injection molding by cutting, machining, bending, drawing, grinding, polishing, sawing, milling, discharge working, drilling, pressing or the like.

The shaped metal that has been worked into the required shape and structure must be such that the face to be bonded is thick and has not been oxidized or hydroxylated, and if there is any obvious rust on the surface after the material has stood for a long period, it must be removed by polishing. The material is dipped for several minutes in a 50 to 70° C. degreasing solution, obtained by dissolving a commercially available aluminum degreaser in water and rinsed with water to remove any oil layer, finger oil, dirt or the like left on the surface after the metal working step. This product is then dipped in a weak aqueous solution of an acid or a base with a concentration of a few percent and rinsed with water, while the aluminum alloy surface is dissolved and chemically etched, which produces an attractive, fresh metal face. This shaped aluminum alloy is then dipped in an aqueous solution of ammonia, hydrazine, or a water-soluble amine compound. The purpose of this dipping step is to perform superfine etching, in which the surface of the shaped aluminum alloy obtained in the previous step is covered with countless superfine recesses with a diameter of 20 to 50 nm and to make the surface of the shaped aluminum alloy adsorb the amine compound. After this dipping is finished, the shaped aluminum alloy is thoroughly rinsed with water, placed in a warm air dryer, and dried. This product is wrapped in aluminum foil so that the sites related to joining may not be touched by hands and then put in a bag, sealed and stored.

The thermoplastic resin used in the injection joining of the present invention is preferably a PBT resin or a PPS resin, but may be another thermoplastic resin instead. However, a key point that applies to all thermoplastic resins is that the linear expansion of the thermoplastic resin must be matched to the linear expansion of the metal. Examples of the polymer component in PBT resin compositions that can be used include a PBT homopolymer, a polymer compound of PBT and polycarbonate (PC), a polymer compound of PBT and an ABS (acrylonitrile-butadiene-styrene) resin, a polymer compound of PBT and polyethylene terephthalate (PET) and a polymer compound of PBT and polystyrene (PS). In addition to these polymers, the composition preferably includes a filler in an amount of 20 to 40% of the total. The filler content is extremely important from the standpoint of making the linear expansion the same for the thermoplastic resin composition and the shaped aluminum alloy. Fillers include glass fiber, carbon fiber, aramid fiber, other high-strength fibers of this type, as well as calcium carbonate, magnesium carbonate, silica, talc, clay, pulverized carbon fiber or aramid fiber and other resin filling inorganic fillers of this type. Even when no filler is contained, the joint is so strong that the PBT resin composition of PPS resin composition joined to the shaped aluminum alloy cannot be removed without enough strong force. However, if a joined composite is subjected to a temperature cycle test, the adhesive strength will rapidly decrease as the cycling is continued.

This indicates that the difference in linear expansion between the aluminum alloy and the PBT resin composition or PPS resin composition cannot be ignored. In general, the thermoplastic resin composition has linear expansion that is several times greater than that of the shaped metal and the difference cannot be ignored. The linear expansion of an aluminum alloy has the highest level of all metals and it is in a range of 2.4 to $2.5 \times 10^{-5}$/° C. A thermoplastic resin, on the other hand, such as a PBT resin containing no filler, has a linear expansion of 7 to $8 \times 10^{-5}/°$ C., which is about three times the linear expansion of the aluminum alloy. The linear expansion of many other thermoplastic resins is within a range of 5 to $9 \times 10^{-5}/°$ C., and just as with a PBT resin, the linear expansion can be fairly close to that of the aluminum alloy by properly selecting the type and amount of filler contained in thermoplastic resins.

Another issue related to the resin is that molding shrinkage occurs in a thermoplastic resin composition. The molding shrinkage of a thermoplastic resin composition containing no filler is about 0.6% at the least and many thermoplastic resin compositions can shrink 0.3 to 0.5% if they contain 20 to 40% filler. However, even an aluminum alloy, which has one of the highest linear expansions of all metals, undergoes cooling shrinkage. For example, if we assume that it cools by about 100° C. from the temperature during injection down to room temperature, shrinkage of approximately 0.2% is smaller than the molding shrinkage of the thermoplastic resin composition, so there is a difference. This poses quite a problem. Once the thermoplastic resin is separated from the metallic mold and settles for a while, there is the possibility that internal strain will appear at the interface and that just a slight impact will bring about interfacial failure and separation. If the injection joining force is strong, however, such as with an integrated product obtained by injection molding by the method of Patent Document 1, for the product which is allowed to stand for about an hour at a high temperature (about 150° C. in the case of a PBT resin) within a few days, any remaining internal strain can be eliminated. Therefore, an important matter in relation to the thermoplastic resin composition of the present invention is to add a filler so as to lower the linear expansion of the thermoplastic resin to be on a par with that of a metal.

Next, the insert injection molding method of the present invention will be described. A metallic mold for injection molding is prepared, the metallic mold is opened and a shaped metal that has undergone pretreatment, etc., is inserted therein, the metallic mold is closed, a thermoplastic resin is injected, the metallic mold is reopened and the molded article is taken out. The injection conditions are preferably matched to the characteristics of the thermoplastic resin being used. What is important during this injection molding is that the metallic mold be kept at a high temperature. Under molding conditions such that the shape of the thermoplastic resin can barely be formed, the outer periphery of the thermoplastic resin will not have enough activity for joining

[Shape of Boss and Seat]

The cause of tilting of the boss 101 (see FIG. 17) of the composite 100, which has been integrated by conventional injection joining, in the direction of the injection gate mark was variously examined by repeated analysis, such as flow analysis by computer. As a result, even when the size of the boss, the hole diameter, and the size (diameter) and thickness of the seat were varied, the location of the highest temperature when the boss was completely filled with resin was always shifted in the direction of the injection gate mark away from the center axis of the boss. Therefore, in cooling after filling or radiant cooling after parting, the resin density tends to be low at the location of the highest temperature it is believed that the center of shrinkage is located here.

Therefore, for the boss to be injection molded with high perpendicular precision, the location of the highest temperature when the boss was completely filled with resin should be shifted to the boss center. With the present invention, the problems were solved by the following manner.

(1) The boss is filled with thermoplastic resin from two opposing directions at the same time.

(2) Rotational action is added during the inflow action of the thermoplastic resin filling the boss portion.

An advantage of the metal and resin composite and the manufacturing method thereof of the present invention is that it is easy to integrate a shaped thermoplastic resin having an upright molding to one face of a shaped metal by injection joining. Specifically, since integration by injection joining can be performed without reducing the strength of the thermoplastic resin flow, a powerful joint strength is obtained, and the shaped thermoplastic resin can be joined to the shaped metal with higher perpendicular precision of the upright molding. For example, there is no tilting of the upright molding to the injection gate mark side, as happened in prior art. Accordingly, a specific shaped metal is made from a metal such as sheet aluminum, this is inserted in an metallic mold for injection molding and a shaped thermoplastic resin having an upright molding can be integrated, as one or more upright moldings, by injection joining without worry about the perpendicular precision of the upright molding with respect to the shaped metal.

The composite of a metal and a resin manufactured by the manufacturing method of the present invention makes it possible for various electronic equipments and parts to be produced easily and with good productivity. Also, electronic equipments, parts, etc., made with this composite will be of light weight and have high precision, a benefit of which is that the process of manufacturing electronic equipments and so forth is simplified and made more efficient.

DETAILED DESCRIPTION OF THE PREFERRED EMBODIMENT

Embodiments of the present invention will now be described in the form of working examples.

Embodiment 1

Figure 1:
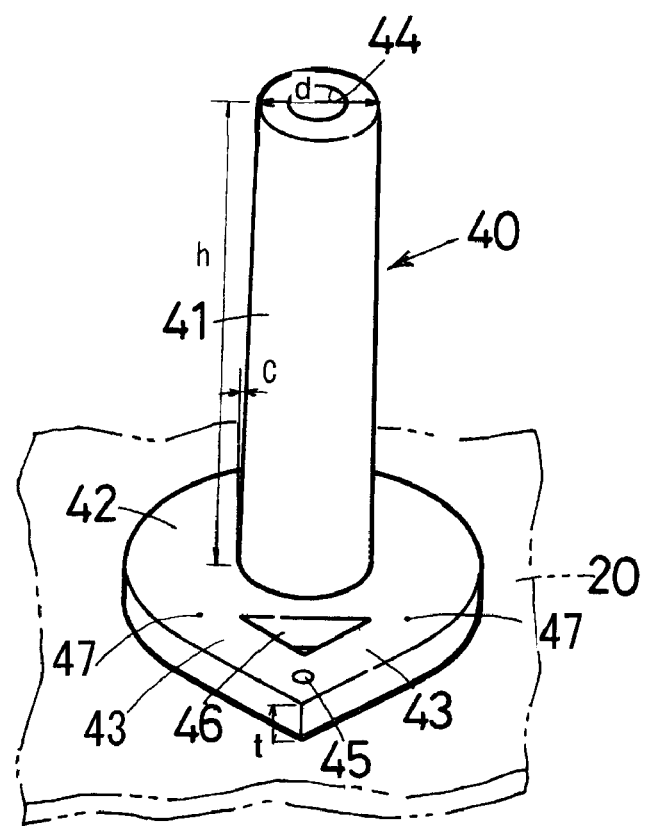
FIG. 1 is an oblique view of a composite 40 in which a shaped thermoplastic resin is integrated by injection joining to a shaped metal.
Figure 2:
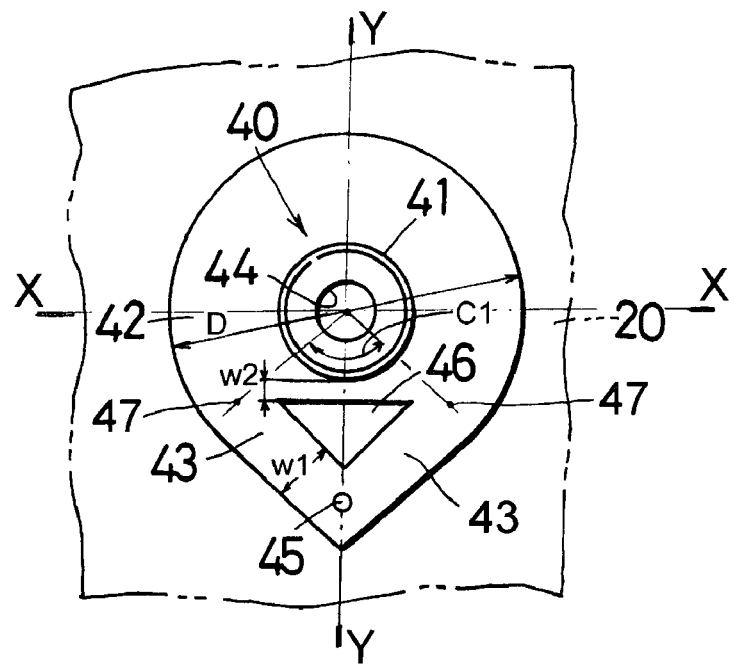
FIG. 2 is a plan view of the composite 40.
Figure 3:
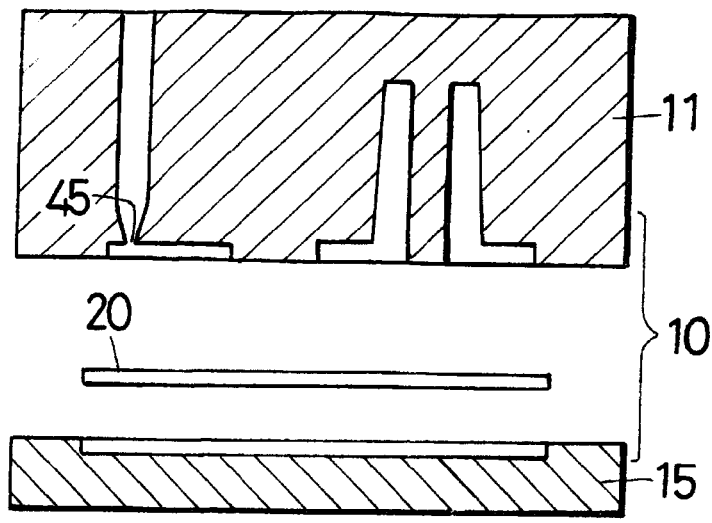
FIGS. 3A, 3B, and 3C are cross-sectional views illustrating the metallic mold and steps for molding the composite 40.
Figure 3:
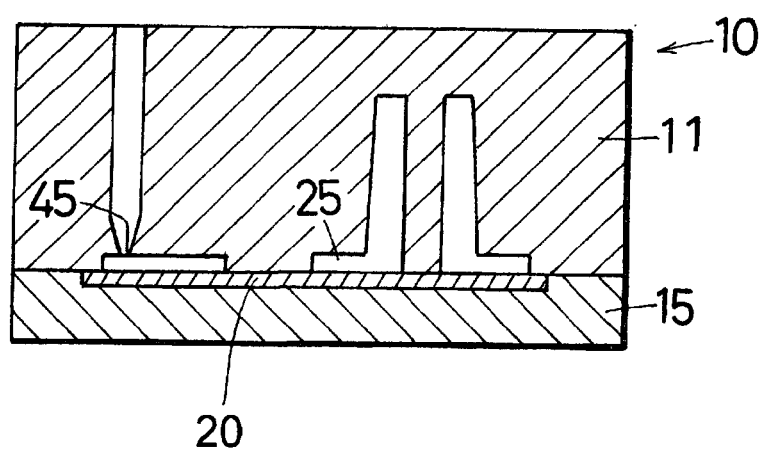
Figure 3:
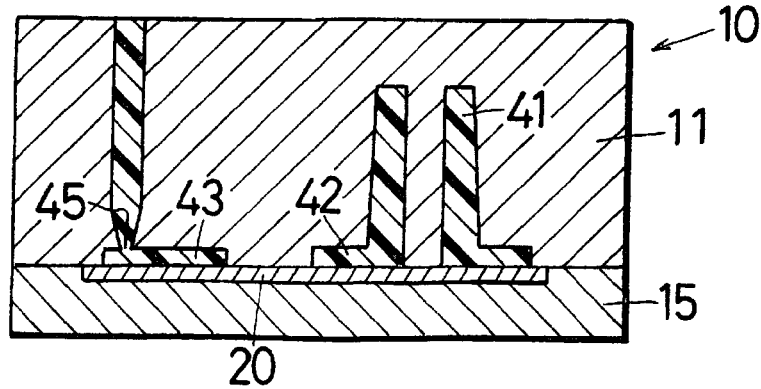

FIG. 1 is an oblique view of a composite 40 in which a shaped thermoplastic resin having an upright molding (boss) is integrated with a shaped metal by injection joining. FIG. 2 is a plan view of the composite 40. FIGS. 3A, 3B, and 3C schematically illustrate the metallic mold and steps for molding the composite 40 in which a thermoplastic resin is integrated with a shaped metal by injection joining. FIG. 3A illustrates the state when the mold is opened, FIG. 3B illustrates the state when the mold is closed and FIG. 3C illustrates the state when the thermoplastic resin is injected into the metallic mold.

A commercially available A5052 aluminum alloy sheet with a thickness of 1 mm was purchased and cut into rectangular pieces measuring 40 mm×60 mm. These aluminum alloy pieces (hereinafter referred to as aluminum pieces) were subjected to the following liquid treatment as pretreatment. A dipping jig completely covered with vinyl chloride resin was fabricated by braiding stainless steel wire and dipped it in molten vinyl chloride resin and many of the cut aluminum pieces were fitted therein.

A 15% aqueous solution of a commercially available aluminum degreaser was placed in a degreasing tank and brought to 70° C. The dipping jig containing the aluminum pieces was dipped for 5 minutes in this tank, and then washed by dipping it in a water rinsing tank. This product was then dipped for 1 minute in a 40° C. preliminary acid washing tank containing a 1% hydrochloric acid aqueous solution and then washed by dipping it in another water rinsing tank.

This product was then dipped for 1 minute in a 40° C. alkali etching tank containing a 1% caustic soda aqueous solution and then washed by dipping it in another water rinsing tank. Next, it was dipped for 1 minute in a 40° C. neutralization tank containing a 1% hydrochloric acid aqueous solution and then washed by dipping in another water rinsing tank. After this, it was dipped for 1 minute in a 60° C. main treatment tank containing a hydrazine monohydrate aqueous solution with a concentration of 4% and then washed by dipping in another water rinsing tank. The aluminum alloy pieces fitted in the dipping jig were placed in a warm air dryer and dried for 15 minutes at 40° C. and 5 minutes at 60° C. The aluminum alloy pieces were removed from the dipping jig, wrapped in aluminum foil and stored.

The metallic mold 10 shown in FIGS. 3A, 3B, and 3C was fabricated for integrating the shaped thermoplastic resin having an upright molding (boss) shown in FIG. 1 (hereinafter referred to as a shaped resin) by injection joining. The metallic mold 10 is made up of a first metallic mold 11 and a second metallic mold 15. A cavity 25 into which resin is injected is formed in the first metallic mold 11 and the second metallic mold 15. An aluminum piece 20 can be inserted and placed at a specific location of this cavity 25. That is, in a state in which the first metallic mold 11 has been separated from the second metallic mold 15, the aluminum piece 20 is inserted and placed at a specific location (see FIG. 3A). The first metallic mold 11 and the second metallic mold 15 are closed to form the cavity 25 (see FIG. 3B). The metallic mold 10 then is preferably heated to 140° C.

A PPS resin (trademark SGX120, made by Tosoh Co.; referred to as "resin" below) is injected through an injection gate 45 into the cavity 25 at an injection temperature of 310° C. A shaped composite 40 of metal and resin having a boss (upright molding) 41 on the aluminum piece 20 was injection molded in this manner (see FIG. 3C). In this Embodiment 1, approximately twenty of the composites 40 were injection molded. A hole 44 is formed in the boss 41 with its bottom being the aluminum piece. A runner 43 is split into two directions by a splitter 46 and communicates with a seat 42 through sprues 47. The angle C1 at the intersection of the two lines linking the center of the boss 41 with the sprues 47 is preferably about 80 to 180 degrees. The width w1 of the runner 43 is preferably greater than the width w2 between the splitter 46 and the outer periphery of the boss 41. For example, with the composite 40 in Embodiment 1, this angle C1 is approximately 100 degrees. The diameter D of the seat 42 is 12 mm, the width w1 of the runner 43 is 2 mm and the width w2 between the splitter 46 and the outer peripheral face of the boss 41 is 1 mm here. Further, the diameter d of the upper part of the boss is 4 mm, the inside diameter of the hole 44 is 2 mm and the inclination C of the outer peripheral face of the boss 41 is approximately 2 degrees. The height h of the boss is 15 mm and the height t of the seat 42 is 1 mm.

Let us consider the shape of the boss 41, etc., using as a reference the line Y-Y connecting the center position of the boss 41 and the center position of the injection gate 45. As shown in plan view of FIG. 2, the boss 41, the seat 42, the runner 43, the sprues 47 and so forth are formed in symmetry or substantially in symmetry. Therefore, towards the left and right of the line Y-Y (FIG. 2), the resin is able to flow from both sides uniformly or substantially uniformly to opposite locations of the seat 42 and the boss 41. Let us now consider this using as a reference the line X-X that is perpendicular to the line Y-Y. In the plan view, the boss 41 and the seat 42 are not symmetrical. Meanwhile, the flow of resin is directed through the sprues 47 upward in FIG. 2. That is, the resin tends to flow upward in FIG. 2. The relationship between the width w2 and the width w1 is such that w1>w2. In Embodiment 1, this fact is utilized so that the resin flows from both sides uniformly or substantially uniformly to opposite locations of the boss above and below the line X-X (FIG. 2). In other words, to prevent bias from occurring as a result of the resin starting to flow from the side nearer the injection gate at the bottom of the boss, improvements are made for the shape of the runner 43, the splitter 46, etc., so that the resin flow is guided preferentially to the farther side away from the injection gate 45. As a result, the flow rate the resin per unit of time flowing into the boss 41 is balanced so that the amount of resin flow from both sides to opposite locations of the boss 41 may be uniform or substantially uniform. The splitter, runner, and so forth are not limited to the shapes and dimensions mentioned above. Of course, what is important is that the shape, etc., should be such that the resin flows uniformly or substantially uniformly with respect to the lines X-X and Y-Y.

The resin injected through the injection gate 45 flows into the boss 41 via the two runners 43 split by the splitter 46, the sprues 47 and the seat 42. The resin flows into and fills the opposite locations of the boss 41 from both sides uniformly or substantially uniformly with respect to the direction of the line X-X and the direction of the line Y-Y. Accordingly, for the composite 40, the molten resin flows into and fills the opposite locations of the boss 41 uniformly or substantially uniformly. This means that when the boss 41 is completely filled with resin, the position of the highest temperature of the resin, etc., is near the center of the boss 41. After this, the integrated composite 40 is placed in a air dryer kept at 170° C. for 1 hour then gradually cooled to eliminate internal strain.

Figure 18:
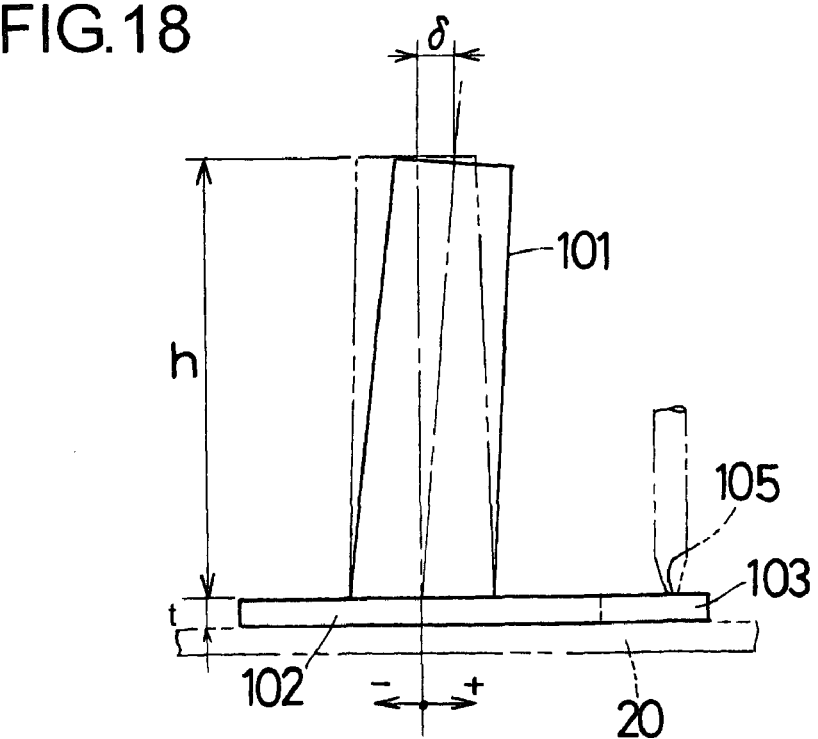
FIG. 18 is a front view of the composite 100 schematically illustrating the error that occurs in the perpendicular precision of a boss.

It could be confirmed visually that the boss was not tilted, but to check this further, the perpendicular precision of the boss 41 was measured with a three-dimensional gauge. Specifically, the error δ of the center position at the top of the boss with respect to the center position at the bottom of the boss was measured (see FIG. 18). The error δ was from +0.01 mm to +0.04 mm and the amount of tilt was (+0.01 mm to +0.04 mm)/15 mm, indicating high precision. There was no tilting of the boss 41 towards the injection gate mark side that happened with prior art.

Embodiment 2

Figure 4:
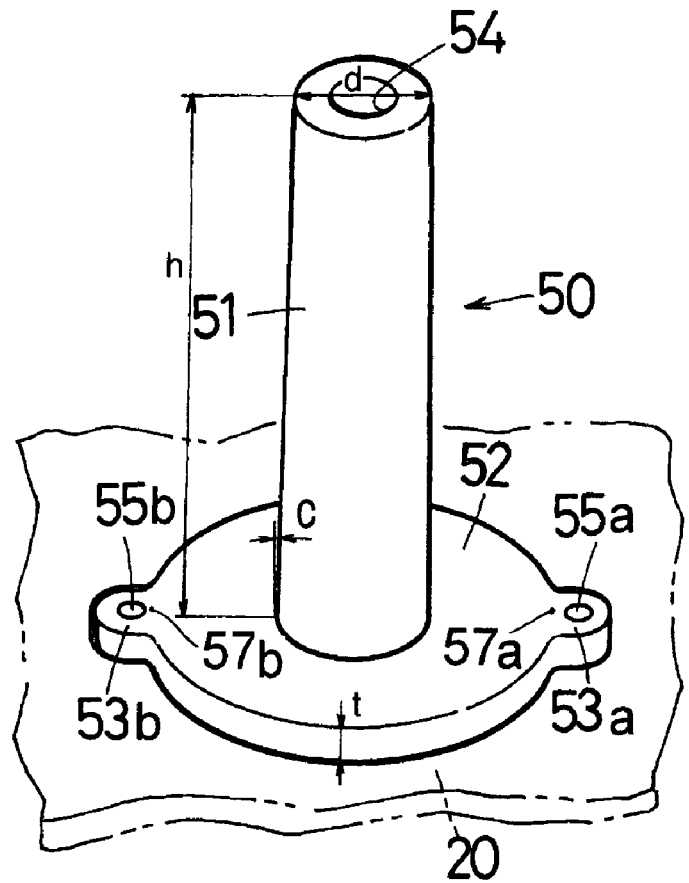
FIG. 4 is an oblique view of a composite 50 in which a shaped thermoplastic resin is integrated by injection joining to a shaped metal.
Figure 5:
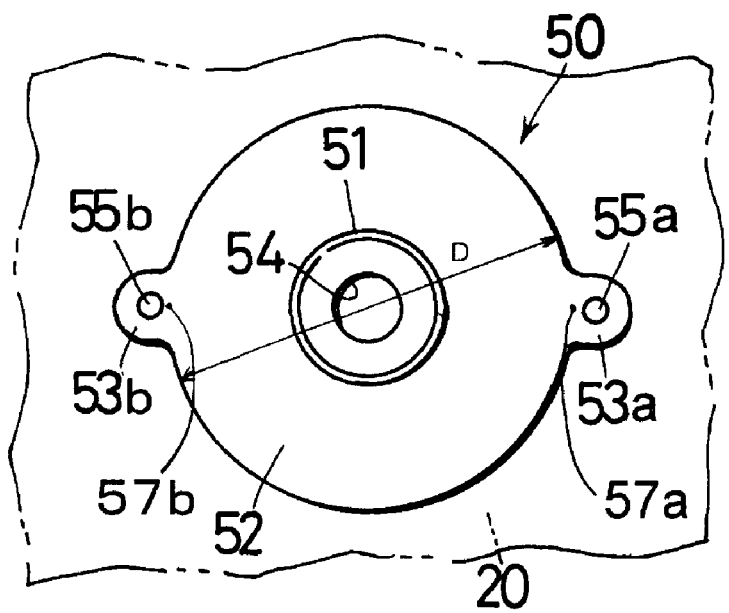
FIG. 5 is a plan view of the composite 50.
Figure 6A:
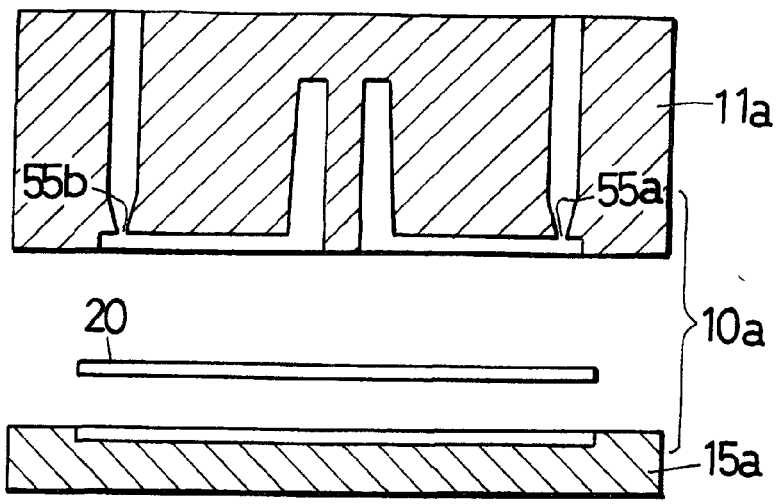
FIGS. 6A, 6B, and 6C are cross-sectional views illustrating the metallic mold and steps for molding the composite 50.
Figure 6B:
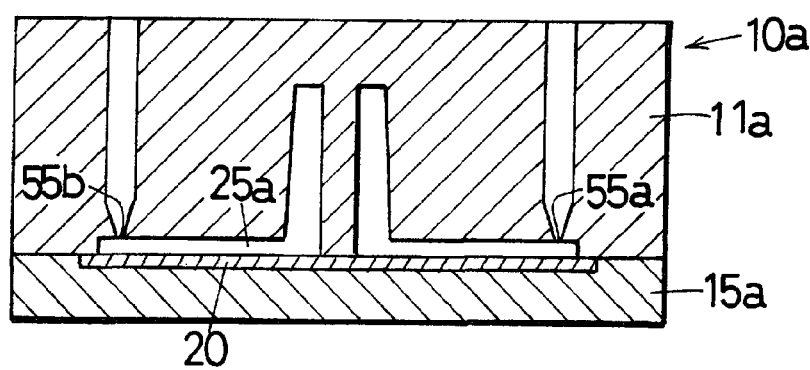
Figure 6C:
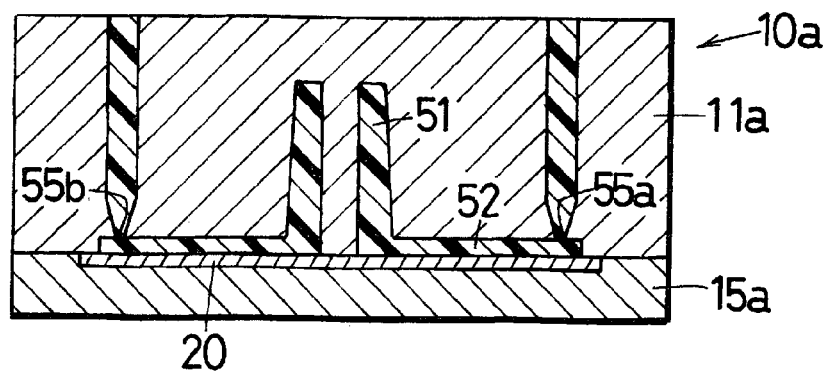

FIG. 4 is an oblique view of a composite 50 in which a shaped thermoplastic resin having a boss or the like is integrated with a shaped metal by injection joining. FIG. 5 is a plan view of the composite 50. FIGS. 6A, 6B and 6C schematically illustrate the mold and steps for molding the composite 50, in which a thermoplastic resin is integrated with a shaped metal by injection joining. FIG. 6A illustrates the state when the mold is opened, FIG. 6B illustrates the state when the mold is closed and FIG. 6C illustrates the state when the thermoplastic resin is injected into the mold.

In the following description of Embodiment 2, those components that are the same as in Embodiment 1 will be referenced with the same numbers and will not be described in detail again.

The same liquid treatment as in Embodiment 1 was performed to produce an aluminum piece 20. The mold 10a shown in FIGS. 6A, 6B and 6C was fabricated for molding a composite 50 in which the shaped resin shown in FIGS. 4 and 5 is integrated with the aluminum piece 20 at its top portion by injection joining. The metallic mold 10a is made up of a first metallic mold 11a and a second metallic mold 15a. A cavity 25a into which resin is injected is formed in the first metallic mold 11a and the second metallic mold 15a. An aluminum piece 20 can be inserted and placed at a specific location of this cavity 25. That is, in a state in which the first metallic mold 11a has been separated from the second metallic mold 15a, the aluminum piece 20 is inserted into a specific location (see FIG. 6A). The first metallic mold 11a and the second metallic mold 15a are closed to form the cavity 25a (see FIG. 6B). The metallic mold 10a then is preferably heated to 140° C.

In the Embodiment 2, a symmetrical shape is used for the runner, etc., leading to injection gates 55a and 55b so that the resin may flow into the cavity 25a at the same timing through the two injection gates 55a and 55b. Also, in the plan view, a boss 51, runners 53a and 53b, sprues 57a and 57b, a seat 52 and so forth have symmetrical or substantially symmetrical shapes with respect to a straight line connecting the injection gate 55a, the center of the boss 51 and the injection gate 55b. Furthermore, the boss 51, the runners 53a and 53b, the sprues 57a and 57b, the seat 52 and so forth have symmetrical or substantially symmetrical shapes with respect to a straight line perpendicular to the line connecting the injection gate 55a, the center of the boss 51 and the injection gate 55b.

The aluminum piece 20 is inserted and placed at a specific location of the mold 10a, which has been heated to 140° C., and the resin is injected through the injection gates 55a and 55b at an injection temperature of 310° C. The composite 50 as a shaped article of metal and resin having the boss 51 on the aluminum piece 20 was molded in this manner. In Embodiment 2 here, approximately twenty of the composites 50 were injection molded. A hole 54 is formed in the boss 51 with its bottom being the aluminum piece. The resin injected through the injection gates 55a and 55b flows into the boss 51 via the two runners 53a and 53b in symmetrical locations, the sprues 57a and 57b and the seat 52. The resin flow rate per unit of time into the boss 51 is balanced and therefore the molten resin flows into and fills the opposite locations of the boss 51 uniformly or substantially uniformly from both sides. This means that, when the boss 51 is completely filled with resin, the position of the highest temperature of the resin, etc., is near the center of the boss 51. After this, the integrated composite 50 is placed in an air dryer kept at 170° C. for 1 hour then gradually cooled to eliminate internal strain.

It could be confirmed visually that the boss 51 was not tilted, but to check this further, the perpendicular precision of the boss 51 was measured with a three-dimensional gauge. Specifically, the error δ of the center position at the top of the boss with respect to the center position at the bottom of the boss was measured. The error δ was from −0.03 mm to +0.03 mm and the amount of tilt was (−0.03 mm to +0.03 mm)/15 mm, indicating high precision. There was no tilting of the boss 51 towards the injection gate mark side that happened with prior art.

Embodiment 3

Figure 7:
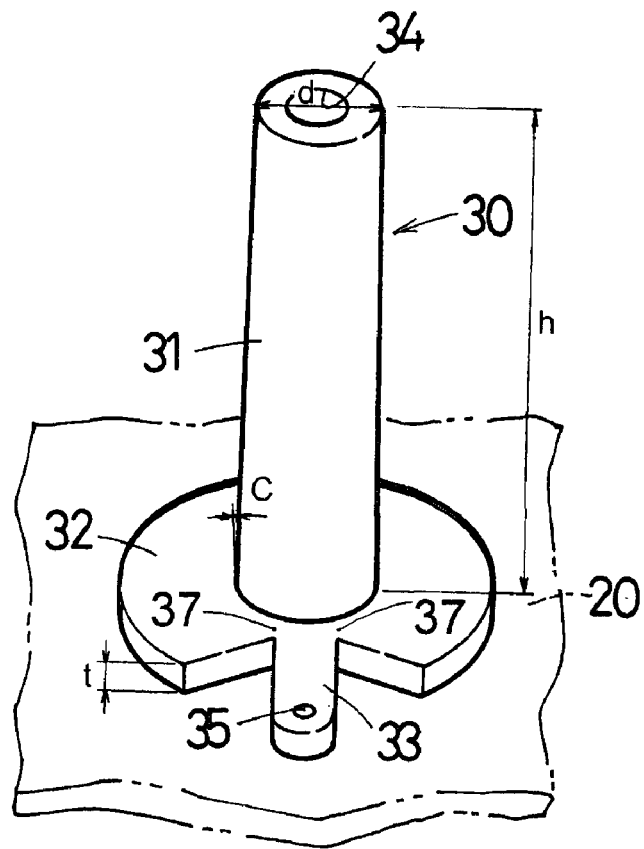
FIG. 7 is an oblique view of a composite 30 in which a shaped thermoplastic resin is integrated by injection joining to a shaped metal.
Figure 8:
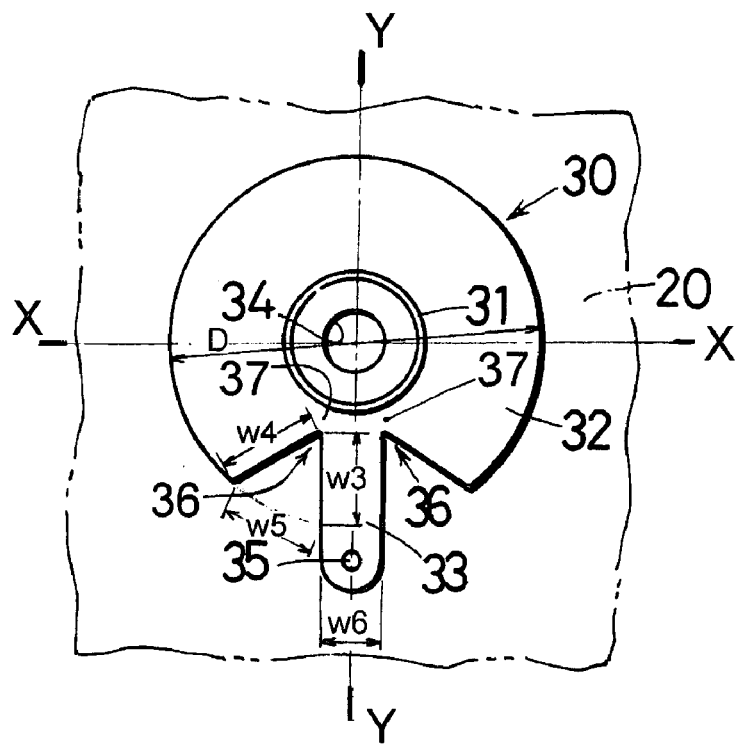
FIG. 8 is a plan view of the composite 30.

FIG. 7 is an oblique view of a composite 30 in which a shaped thermoplastic resin is joined to a shaped metal by injection joining. FIG. 8 is a plan view of the composite 30.

The same liquid treatment as in Embodiment 1 was performed to produce an aluminum piece 20. A metallic mold was fabricated for molding a composite 30 in which the shaped resin shown in FIGS. 7 and 8 is integrated by injection joining. This metallic mold was substantially the same as that in Embodiment 1 and will therefore not be described again. The aluminum piece 20 was inserted into the metallic mold, which had been heated to 140° C. and injection joining was performed by injecting the resin through the injection gate at an injection temperature of 310° C. Approximately twenty of the composites 30 were injection molded. A hole 34 is formed in the boss 31 with its bottom being the aluminum piece 20.

A runner 33 communicates with a seat 32 through sprues 37. The sprues 37 were provided by forming cut-outs 36 near the location where the runner 33 communicates with the seat 32. For the composite 30 in Embodiment 3 here, the cut-outs 36 are formed such that the dimensions are w3=3 mm, w4=3 mm and w5=4 mm, for example. The width w6 of the runner 33 is 2 mm. The width between the cut-outs 36 and the outer peripheral face of the boss 31 is preferably smaller than the width w6 of the runner 33.

Let us consider the shape of the boss 31, etc., using as a reference the line Y-Y connecting the center position of the boss 31 and the center position of the injection gate 35. As shown in the plan view of FIG. 8, the boss 31, the seat 32, the runner 33, the sprues 37 and so forth are formed in symmetry or substantially in symmetry. Therefore, towards the left and right of the line Y-Y (FIG. 8), the resin is able to flow from both sides uniformly or substantially uniformly to opposite locations of the seat 32 and the boss 31. Let us now consider this using as a reference the line X-X that is perpendicular to the line Y-Y. In the plan view, the boss 31 and the seat 32 are not symmetrical. Meanwhile, the resin flows through the runner 33 and upward in FIG. 8. That is, the resin tends to flow upward in FIG. 8. Also, the resin tends not to flow downward in FIG. 8 because of the cut-outs 36. If no action is taken, the resin will tend to flow from the side near the injection gate 35

(the lower side in FIG. 8) but in Embodiment 3 here the resin is guided so that it tends to flow to the farther side away from the injection gate 35 (the upper side in FIG. 8) and, as a result, the flow rate of the resin into the boss 31 per unit of time is balanced. Because of this, the resin flows such that the amount is uniform or substantially uniform from both sides to opposite locations of the boss 31.

In Embodiment 3, this fact is utilized so that the resin flows from both sides uniformly or substantially uniformly to opposite locations of the seat 32, the boss 31 and so forth above and below the line X-X (FIG. 8). The runner, cut-outs and so forth are not limited to the shapes and dimensions mentioned above. Of course, what is important is that the shape, etc., should be such that the resin flows uniformly or substantially uniformly with respect to the lines X-X and Y-Y.

The resin injected through the injection gate 35 flows into the boss 31 via the runner 33, the sprues 37 and the seat 32. For the composite 30 in Embodiment 3, because of the resin flow, the cut-outs 36, etc., the resin tends to flow to the opposite injection gate side of the seat 32 rather than to the side near the injection gate 35 of the seat 32 (the injection gate side). In other words, the runner 33, the seat 32 and the cut-outs 36 are shaped so as to facilitate the straight flow of the resin to the opposite injection gate side of the seat 32 and the resin flows uniformly or substantially uniformly to the injection gate side and opposite injection gate side of the boss 31. Consequently, the resin that has flowed to the seat 32 flows into and fills the opposite locations of the boss 31 from both sides uniformly or substantially uniformly with respect to the direction of the line X-X and the direction of the line Y-Y. Accordingly, when the boss 31 is completely filled with resin, the position of the highest temperature of the resin, etc., is near the center of the boss 31. The integrated composite 30 is placed in an air dryer kept at 170° C. for 1 hour and then gradually cooled to eliminate internal strain.

It could be confirmed visually that the boss 31 was not tilted, but to check this further, the perpendicular precision of the boss 31 was measured with a three-dimensional gauge. Specifically, the error δ of the center position at the top of the boss with respect to the center position at the bottom of the boss was measured. The error δ was from −0.01 mm to +0.05 mm and the amount of tilt was (−0.01 mm to +0.05 mm)/15 mm, indicating high precision. There was no tilting of the boss 31 to the injection gate mark side that happened with prior art.

Embodiment 4

Figure 9:
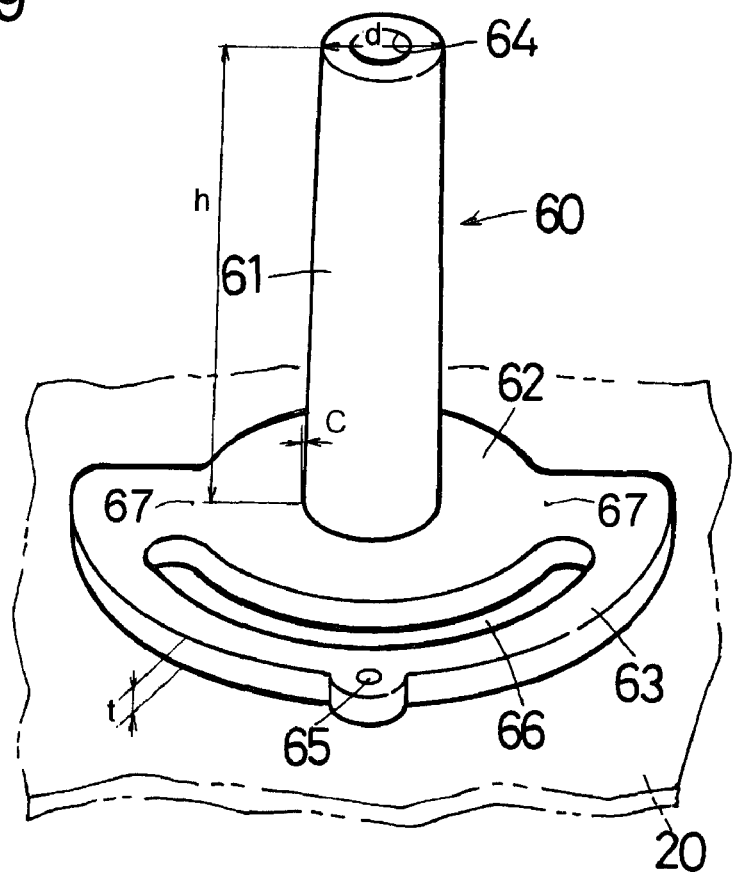
FIG. 9 is an oblique view of a composite 60 in which a shaped thermoplastic resin is integrated by injection joining to a shaped metal.
Figure 10:
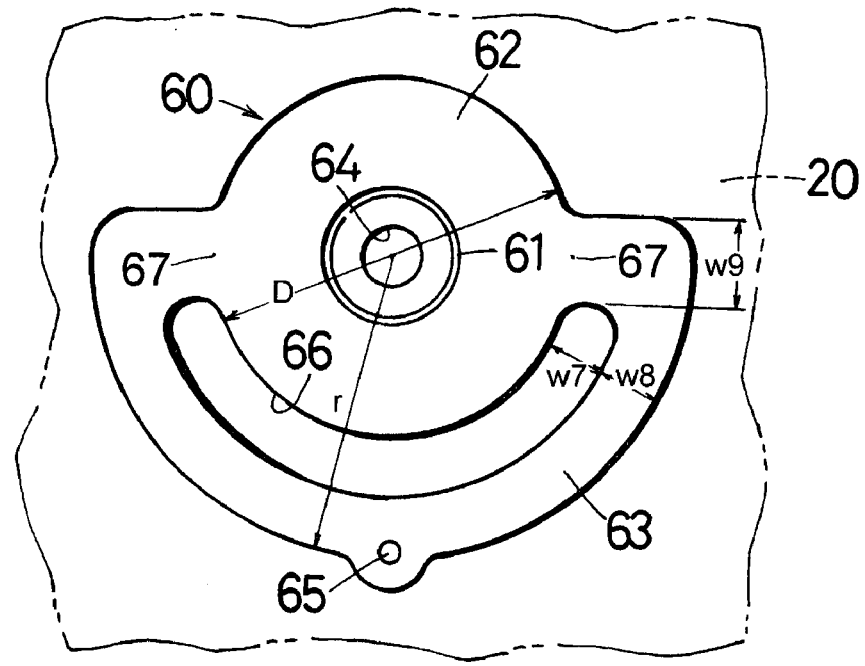
FIG. 10 is a plan view of the composite 60.

FIG. 9 is an oblique view of a composite 60 in which a shaped resin is integrated with a shaped metal by injection joining. FIG. 10 is a plan view of the composite 60.

The same liquid treatment as in Embodiment 1 was performed to produce an aluminum piece 20. A mold was produced for molding the composite 60 in which the shaped resin shown in FIGS. 9 and 10 is integrated by injection joining. This metallic mold was substantially the same as that in Embodiment 1 and will therefore not be described again. In Embodiment 4 here, it can be said that the composite corresponds to one in which the angle C1 in Embodiment 1 is 180 degrees.

The aluminum piece 20 was inserted into the mold, which had been heated to 140° C. and injection joining was performed by injecting the resin through an injection gate 65 at an injection temperature of 310° C. Approximately sixty of the composites 60 were injection molded. A hole 64 is formed in the boss 61 with its bottom being the aluminum piece 20. A runner 63 is split into two directions by a splitter 66 and communicates with a seat 62 through sprues 67. The sprues 67, the seat 62, the boss 61 and so forth are in symmetry or substantially in symmetry with respect both to the line connecting the center position of the injection gate 65 and the center position of the boss 61 and to a line perpendicular to this line. For the composite 60 of Embodiment 4, for example, the outer peripheral radius r of the runner 63 is 10 mm, the width w8 of the runner 63 is 2 mm, the width w7 of the splitter 66 is 2 mm and the width w9 near the sprues 67 is 3 mm. The runner diameter, the widths, etc., are not limited to the shapes and dimensions mentioned above. For instance, the sprues, the runner, etc., may be in symmetry and the shape may be such that the resin can flow uniformly or substantially uniformly from both sides to the opposite locations of the boss. The resin injected from the injection gate 65 flows via the runners 63 split into two directions by the splitter 66, the sprues 67 and the seat 62 into the boss 61. The resin, which has flowed into the seat 62, flows into and fills the opposite locations of the boss 61 from both sides uniformly or substantially uniformly. As a result, the flow rate of the resin into the boss 61 per unit of time is balanced and the resin flows such that the amount is uniform or substantially uniform from both sides to opposite locations of the boss 61. Accordingly, when the boss 61 was completely filled with resin, the position of the highest temperature of the resin, etc., was near the center of the boss 61. The integrated composite 60 was placed in a air dryer kept at 170° C. for 1 hour and then gradually cooled to eliminate internal strain.

It could be confirmed visually that the boss 61 was not tilted, but to check this further, the perpendicular precision of the boss 61 was measured with a three-dimensional gauge. Specifically, the error δ of the center position at the top of the boss with respect to the center position at the bottom of the boss was measured. The error δ was from −0.05 mm to +0.01 mm and the amount of tilt was (−0.05 mm to +0.01 mm)/15 mm, indicating high precision. There was no tilting of the boss 61 to the injection gate mark side that happened with prior art.

Embodiment 5

Figure 11:
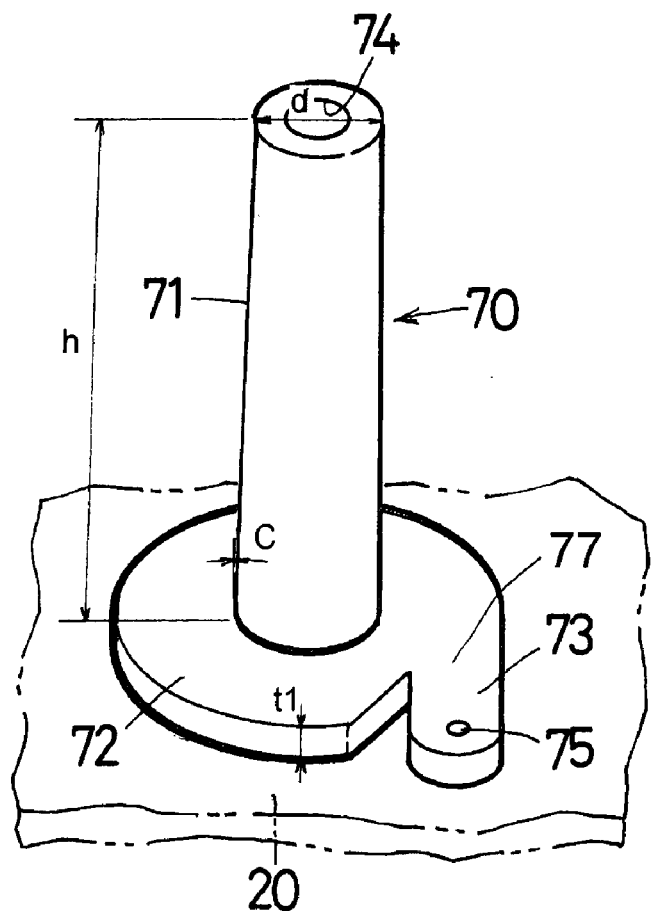
FIG. 11 is an oblique view of a composite 70 in which a shaped thermoplastic resin is integrated by injection joining to a shaped metal.
Figure 12:
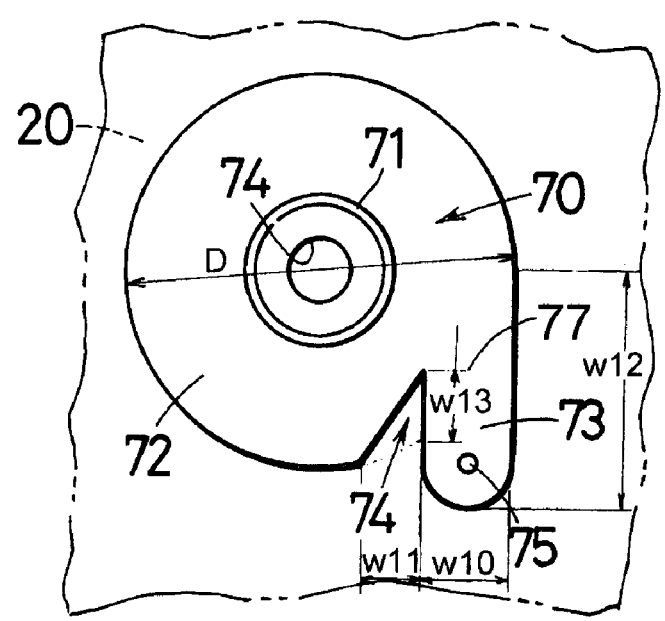
FIG. 12 is a plan view of the composite 70.

FIG. 11 is an oblique view of a composite 70 in which a shaped resin is integrated with a shaped metal by injection joining. FIG. 12 is a plan view of the composite 70.

The same liquid treatment as in Embodiment 1 was performed to produce an aluminum piece 20. A metallic mold was fabricated for molding the composite 70 in which the shaped resin shown in FIGS. 11 and 12 is integrated with the aluminum piece 20 at its top portion by injection joining. This metallic mold was substantially the same as that in Embodiment 1 and will therefore not be described again.

The aluminum piece 20 was inserted into the metallic mold, which had been heated to 140° C., and injection joining was performed by injecting the resin through an injection gate 75 at an injection temperature of 310° C. Approximately twenty of the composites 70 were injection molded. A hole 74 is formed in the boss 71. A runner 73 is configured so as to be in contact with the outer periphery of a seat 72 and communicates with the seat 72 through sprues 77. For the composite 70 of Embodiment 5, for example, the width w10 of the runner 73 is 3 mm. Cut-outs 74 are formed between the sprue 77 and the seat 72. The dimensions of these cut-outs 74, etc., are such that w11=1.5 mm, w12=7.5 mm, and w13=2 mm. Also, the height t1 of the seat 72 is 1.5 mm. The runner, the cut-outs and so forth are not limited to the shapes and dimensions mentioned above. Of course, what is important is that the shape, etc., should be such that the resin flows into and fills the boss while undergoing circulating motion.

The resin injected through the injection gate 75 flows in the tangential direction of the circular seat 72 and flows into the boss 71 via the runner 73 formed so as to be in contact with the outer periphery of the seat 72 at the base of the boss 7, the sprues 77 and the seat 72. The configuration is such that the resin flowing in through the sprues 77 readily undergoes circulating motion because the cut-outs 74 are formed between the sprue 77 and the seat 72, because there is a flow of molten resin and so on. The resin that has flowed into the seat 72 flows into and fills the boss 71 and the seat 72 while undergoing circulating motion. As a result, when the boss 71 was completely filled with resin, the highest temperature position of the resin, etc., was near the center of the boss 71. The integrated composite 70 was placed in an air dryer kept at 170° C. for 1 hour and then gradually cooled to eliminate internal strain.

It could be confirmed visually that the boss 71 was not tilted, but to check this further, the perpendicular precision of the boss 71 was measured with a three-dimensional gauge. Specifically, the error δ of the center position at the top of the boss with respect to the center position at the bottom of the boss was measured. The error δ was from −0.10 mm to −0.02 mm and the amount of tilt was (−0.10 mm to +0.02 mm)/15 mm, indicating high precision. There was no tilting of the boss 71 to the injection gate mark side that happened with prior art.

Embodiment 6

Figure 13:
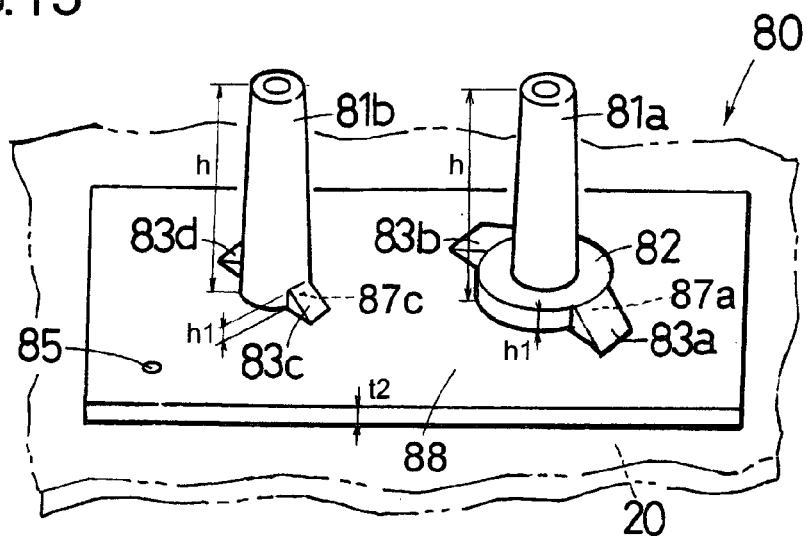
FIG. 13 is an oblique view of a composite 80 in which a shaped thermoplastic resin is integrated by injection joining to a shaped metal.
Figure 14:
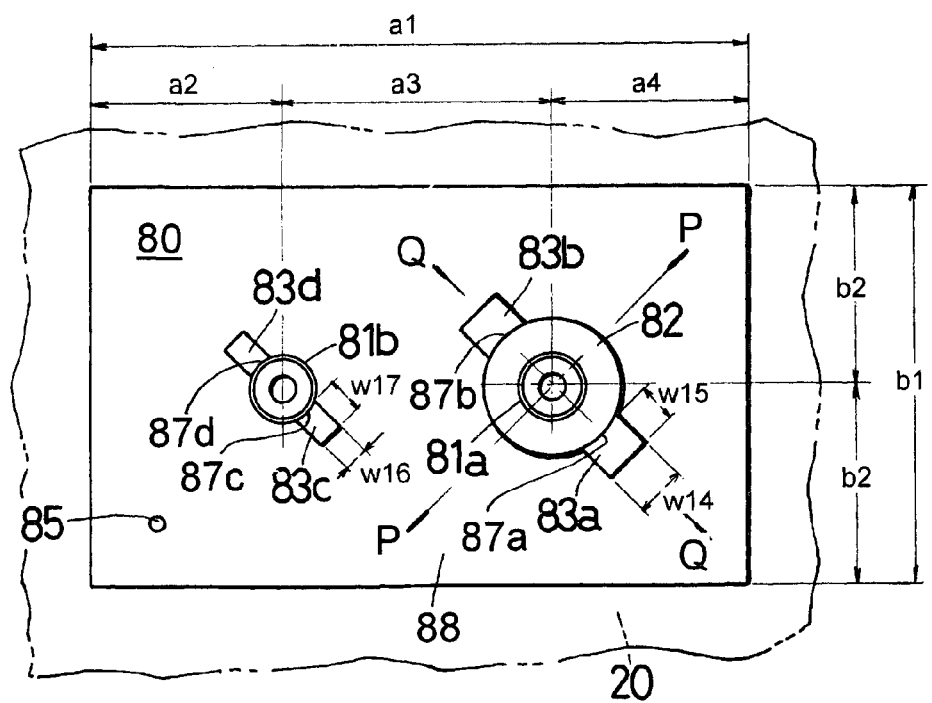
FIG. 14 is a plan view of the composite 80.

FIG. 13 is an oblique view of a composite 80 in which a shaped resin having a plurality of upright moldings is integrated with a shaped metal by injection joining. FIG. 14 is a plan view of the composite 80.

The same liquid treatment as in Embodiment 1 was performed to produce an aluminum piece 20. A metallic mold was fabricated for molding the composite 80 in which the shaped resin shown in FIGS. 13 and 14 is integrated with the aluminum piece 20 at its top portion. The dimensions of a resin base 88 at the top of the aluminum piece 20 of Embodiment 6 were, for example, a1=50 mm, b1=30 mm and t2=1 mm. Bosses 81a and 81b rose up at a spacing of a2=15 mm, a3=20 mm, a4=15 mm and b2=15 mm.

The aluminum piece 20 was inserted into the metallic mold, which had been heated to 140° C. and injection joining was performed by injecting the resin through an injection gate 85 at an injection temperature of 310° C. Approximately twenty of the composites 80 were injection molded. The resin injected through the injection gate 85 flows over the resin base 88. The resin flows into the boss 81a via runners 83a and 83b, sprues 87a and 87b and a seat 82. The resin flows directly into the boss 81b via runners 83c and 83d and sprues 87c and 87d. The shape of the runners 83a and 83b in Embodiment 6 was such that, for example, w14=4 mm, w15=3 mm and h1=1.5 mm. Also, the shape of the runners 83c and 83d was such that, for example, w16=2 mm and w17=3 mm. The runners 83a and 83b, the sprues 87a and 87b, the seat 82, and the boss 81a are in symmetry or substantially in symmetry with respect to both a straight line Q-Q, which passes through the sprue 87b and the center of the boss 81a, and a straight line P-P, which is perpendicular to the line Q-Q. Also, the runners 83c and 83d, the sprues 87c and 87d and the boss 81b are in symmetry or substantially in symmetry with respect to both a straight line, which passes through the sprue 87d and the center of the boss 81b, and a straight line, which is perpendicular to this line. Specifically, the resin can flow and fill from both sides uniformly or substantially uniformly to the opposite locations of the bosses 81a and 81b. This means that, when the cavities of the bosses 81a and 81b are completely filled with resin, the position of the highest temperature of the resin, etc., are near the centers of the bosses 81a and 81b.

The integrated composite 80 was placed in a forced air dryer set at 170° C. for 1 hour and then gradually cooled to relieve internal strain. This composite 80 was checked visually and it was almost impossible to detect any tilt of the bosses 81a and 81b.

Embodiment 7

Figure 15:
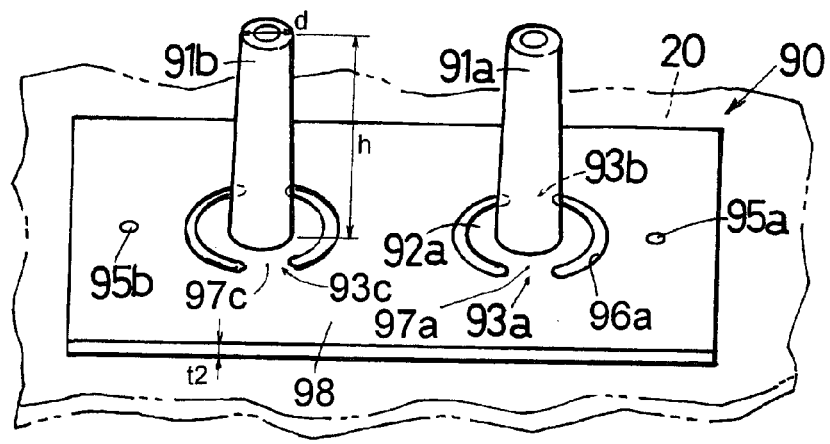
FIG. 15 is an oblique view of a composite 90 in which a shaped thermoplastic resin is integrated by injection joining to a shaped metal.
Figure 16:
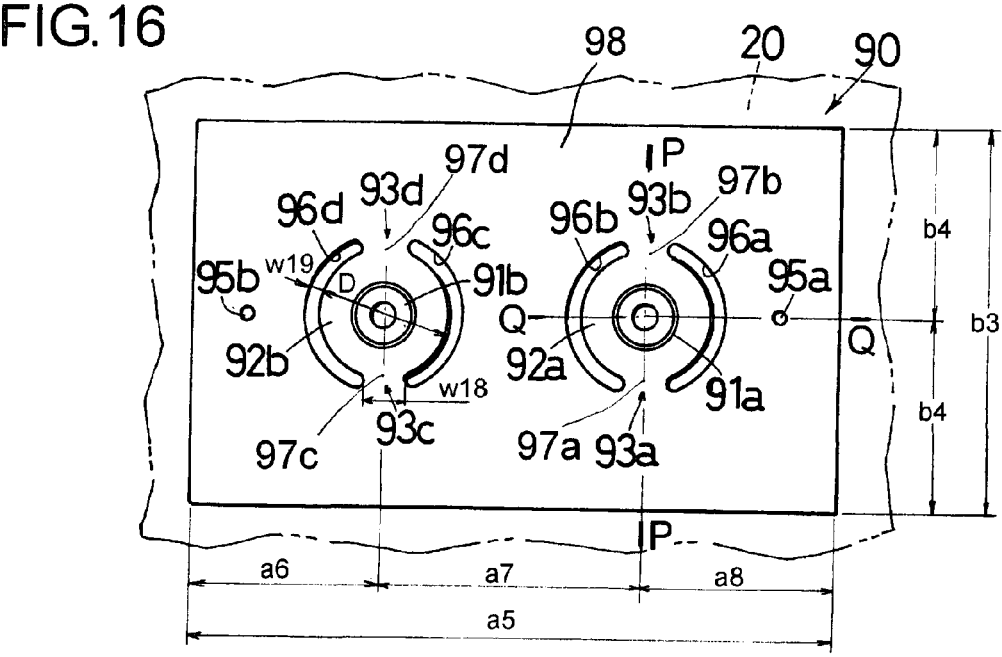
FIG. 16 is a plan view of the composite 90.
Figure 17:
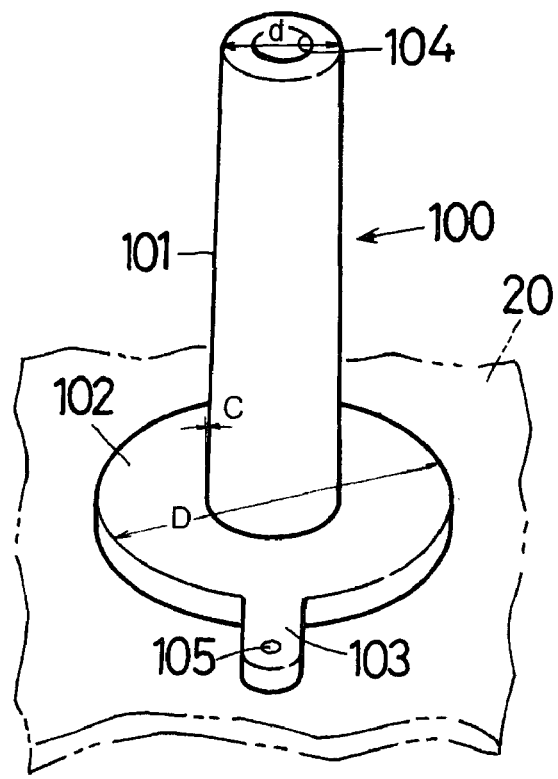
FIG. 17 is an oblique view of a composite 100 in which a shaped thermoplastic resin is integrated by injection joining to a shaped metal.

FIG. 15 is an oblique view of a composite 90 in which a shaped thermoplastic resin is integrated with a shaped metal by injection joining. FIG. 16 is a plan view of the composite 90.

The same liquid treatment as in Embodiment 1 was performed to produce an aluminum piece 20. A metallic mold was fabricated for molding a composite 90 in which the shaped resin shown in FIGS. 15 and 16 is integrated by injection joining. The dimensions of a resin base at the top of the aluminum piece 20 of Embodiment 7 were, for example, a5=50 mm, b3=30 mm and t2=1 mm. Bosses 91a and 91b rose up at a spacing of a6=15 mm, a7=20 mm, a8=15 mm and b4=15 mm.

The aluminum piece 20 was inserted into the metallic mold, which had been heated to 140° C., and injection joining was performed by injecting the resin through injection gates 95a and 95b at an injection temperature of 310° C. Approximately twenty of the composites 90 were injection molded. Arc-shaped slots of splitters 96a and 96b are formed between a resin base 98 and a seat 92a. The width w19 of the splitters (slots) 96a and 96b is, for example, 2 mm and the diameter D of the seat 92a is 12 mm. Runners 93a and 93b are formed between the two splitters 96a and 96b and the portions where the runners 93a and 93b communicate with the seat 92a become sprues 97a and 97b. The width w18 of runners 93c and 93d is, for example, 3 mm. Similarly, arc-shaped slots of splitters 96c and 96d are formed between the resin base 98 and a seat 92b. Runners 93c and 93d are formed between the two splitters 96c and 96d and the portions where the runners 93c and 93d communicate with the seat 92b become sprues 97c and 97d. The runners 93a and 93b, the sprues 97a and 97b, the seat 92a and the boss 91a are in symmetry or substantially in symmetry with respect to both a straight line P-P, which passes through the sprue 97a and the center of the boss 91a, and a straight line Q-Q, which is perpendicular to the line P-P. Similarly, the runners 93c and 93d, the sprues 97c and 97d, the seat 92b, and the boss 91b are in symmetry or substantially in symmetry with respect to both a straight line, which passes through the sprue 97c, the center of the boss 91b and the sprue 97d, and a straight line, which is perpendicular to this line.

The resin injected through the injection gate 95 flows into the resin base 98. The resin that has flowed into the resin base 98 flows to the seat 92a and the boss 91a via the runners 93a and 93b and the sprues 97a and 97b. Similarly, the resin that has flowed to the resin base 98 flows into the seat 92b and the boss 91b via the runners 93c and 93d and the sprues 97c and 97d. The resin flows uniformly or substantially uniformly to the opposite locations of the bosses 91a and 91b. This means that, when the cavities of the bosses 91a and 91b are completely filled with resin, the positions the highest temperature are located at the center of the bosses 91a and 91b.

The integrated composite 90 was placed in an air dryer kept at 170° C. for 1 hour and then gradually cooled to eliminate internal strain. This composite 90 was checked visually and it was almost impossible to detect any tilt.

Embodiments have been described above, but it is not necessary to say that the present invention is not limited to details of these embodiments. While the upright molding has been described as being a boss, it is needless to say that it may instead be a rib or other such upright molding or it may have another shape that protrudes from the shaped metal. It is also needless to say that various modifications can to made to the shapes and dimensions without departing from the object or gist of the invention.

Furthermore, while the pretreatment to which the shaped metal is subjected has been described as being liquid treatment such as dipping and rinsing, it may instead be treatment in which a special organic compound is used to cover the surface of a shaped metal with an organic phase by organic plating, a treatment such as the anodic oxidation of an aluminum alloy (shaped metal) or the like. Specifically, it is not necessary say that it may be a composite of a metal and resin in which a shaped resin is integrated with a shaped metal by injection joining that has undergone some kind of pretreatment. The shaped metal may also be a shaped article made from a metal material other than aluminum.

INDUSTRIAL APPLICABILITY

The metal and resin composite and the method for manufacturing the same according to the present invention can be utilized in housings, parts and units used in electronic equipments, consumer electronic equipments, electrical products, industrial parts, industrial machineries, automobiles and so forth and also in manufacturing these.

What is claimed is:

1. A composite of a metal and a resin, composed of a pretreated shaped metal and a shaped thermoplastic resin integrally joined to one face of the shaped metal by injection molding, wherein the shaped thermoplastic resin comprises a seat (42, 62) and an upright molding (41, 61) protruding from this seat (42, 62), a runner (43, 63) is provided which communicates with the seat (42, 62) via two or more sprues (47, 67) and through which a molten thermoplastic resin injected through an injection gate (45, 65) flows into the upright molding (41, 61), the thermoplastic resin injected through the injection gate (45, 65) flows into and fills locations of the upright molding (41, 61), opposite to each other with respect to a straight line (X-X) passing through the center of the upright molding (41, 61), so that the flow amount per unit of time is substantially uniform, the runner (43, 63) is split into two ways by a splitter (46, 66), the seat (42, 62), the runner (43, 63), the sprues (47, 67) and the upright molding (41, 61) are formed to have a shape in plan view that is symmetrical with respect to a first straight line (Y-Y) passing through the injection gate (45, 65) and the center of the upright molding (41, 61)

the thermoplastic resin is guided preferentially to the upright molding (41, 61) on the farther side away from the injection gate (45, 65) in the direction of a second straight line (X-X) passing through the center of the upright molding (41, 61) and perpendicular to the first straight line (Y-Y), utilizing the direction of flow of the thermoplastic resin coming out of the sprues (47, 67), and the thermoplastic resin flows into and fills locations of the upright molding (41, 61), opposite to each other with respect to the first straight line (Y-Y) and the second straight line (X-X), so that the flow amount per unit of time is substantially uniform.

2. The composite of a metal and a resin according claim 1, wherein said upright molding is a boss.

3. The composite of a metal and a resin according to claim 1, wherein
said upright molding is a rib.

4. A composite of a metal and a resin, composed of a pretreated shaped metal and a shaped thermoplastic resin integrally joined to one face of the shaped metal by injection molding, wherein the shaped thermoplastic resin comprises a seat (92a, 92b), a resin base (98) disposed in the periphery of the seat (92a, 92b) and an upright molding (91a, 91b) protruding from this seat (92a, 92b), runners (93a, 93b, 93c, 93d) are provided which communicate with the seat (92a, 92b) via two or more sprues (97a, 97b, 97c, 97d) and through which molten thermoplastic resin injected through an injection gate (95a, 95b) flows into the upright molding (91a, 91b), the thermoplastic resin injected through the injection gate (95a, 95b) flows into and fills locations of the upright molding (91a, 91b), opposite to each other with respect to a straight line (Q-Q) passing through the center of the upright molding (91a, 91b), so that the flow amount per unit of time is substantially uniform, the sprues (97a, 97b, 97c, 97d) and the upright molding (91a, 91b) are formed to have a shape in plan view that is symmetrical with respect to a first straight line (Q-Q) passing through the center of the upright molding (91a, 91b), splitters (96a, 96b, 96c, 96d) disposed between the resin base (98) and the seat (92a, 92b) are formed so as to form the runners (93a, 93b, 93c, 93d) at locations opposite to each other around the upright molding (91a, 91b), the splitters (96a, 96b, 96c, 96d) cause the thermoplastic resin to be guided preferentially to the upright molding (91a, 91b) on the farther side away from the injection gate (95a, 95b) in the direction of a second straight line (P-P) passing through the center of the upright molding (91a, 91b) and perpendicular to the first straight line (Q-Q), utilizing the direction of flow of the thermoplastic resin, and the thermoplastic resin flows into and fills locations of the upright molding (91a, 91b), opposite to each other with respect to the first straight line (Q-Q) and the second straight line (P-P), so that the flow amount per unit of time is substantially uniform.

5. The composite of a metal and a resin according to any of claim 4, wherein said upright molding is a boss.

6. The composite of a metal and a resin according to any of claim 4, wherein said upright molding is a rib.

* * * * *